US011289995B2

(12) United States Patent
Gensior

(10) Patent No.: US 11,289,995 B2
(45) Date of Patent: Mar. 29, 2022

(54) INVERTER AND METHOD FOR GENERATING AN ALTERNATING CURRENT

(71) Applicant: Wobben Properties GmbH, Aurich (DE)

(72) Inventor: Albrecht Gensior, Dresden (DE)

(73) Assignee: Wobben Properties GmbH, Aurich (DE)

( * ) Notice: Subject to any disclaimer, the term of this patent is extended or adjusted under 35 U.S.C. 154(b) by 320 days.

(21) Appl. No.: 16/095,895

(22) PCT Filed: Apr. 21, 2017

(86) PCT No.: PCT/EP2017/059557
§ 371 (c)(1),
(2) Date: Oct. 23, 2018

(87) PCT Pub. No.: WO2017/186595
PCT Pub. Date: Nov. 2, 2017

(65) Prior Publication Data
US 2020/0381991 A1 Dec. 3, 2020

(30) Foreign Application Priority Data
Apr. 25, 2016 (DE) ...................... 10 2016 107 614.7

(51) Int. Cl.
*H02M 1/12* (2006.01)
*H02M 7/493* (2007.01)
(52) U.S. Cl.
CPC ............ *H02M 1/12* (2013.01); *H02M 7/493* (2013.01)
(58) Field of Classification Search
CPC .................. H02M 1/12; H02M 7/493; H02M 2007/4822; H02M 2007/4835;
(Continued)

(56) References Cited

U.S. PATENT DOCUMENTS 5,546,298 A 8/1996 Rohner
7,613,018 B2 11/2009 Lim et al.
(Continued)

FOREIGN PATENT DOCUMENTS

CN 101039081 A 9/2007
CN 101501972 A 8/2009
(Continued)

OTHER PUBLICATIONS

Meyer et al., "*A Hysteresis Current Control for Parallel Connected Line-Side Converters of an Inverter Locomotive,*" Proceedings of the European Conference on Power Electronics and Applications, London, GB, pp. 102-109, Sep. 13, 1993.
(Continued)

*Primary Examiner* — Gustavo A Rosario-Benitez
(74) *Attorney, Agent, or Firm* — Seed IP Law Group LLP

(57) ABSTRACT

A method for generating an alternating electric current is provided. The method includes generating a plurality of component currents, superposing the component currents to form a summation current. Each component current is modulated by voltage pulses and the voltage pulses for each component current are generated by a component switching device by virtue of the component switching device generating the voltage pulses by switching between different input voltages. The method includes specifying a tolerance band for the summation current having an upper and a lower tolerance limit, where the summation current is detected and the switching of each component switching means is controlled to generate the voltage pulses for modulating the component current depending on the detected summation current with respect to the tolerance band. The plurality of component switching devices are switched at least partly or predominantly in a manner asynchronous with respect to one another.

24 Claims, 6 Drawing Sheets

(58) Field of Classification Search
CPC ......... H02M 2007/5395; H02M 7/539; H02M 7/5387; H02M 7/44; H02M 7/483; H02M 7/49; H02M 7/501; H02M 7/537
See application file for complete search history.

(56) References Cited

U.S. PATENT DOCUMENTS

| | | | |
|---|---|---|---|
| 8,421,389 B2 | 4/2013 | Fraeger | |
| 2007/0147098 A1* | 6/2007 | Mori | H02J 3/1857 363/71 |
| 2007/0273338 A1 | 11/2007 | West | |
| 2011/0181292 A1* | 7/2011 | Oowada | G01R 35/00 324/537 |
| 2012/0249045 A1 | 10/2012 | Kim | |
| 2014/0204643 A1* | 7/2014 | Wagoner | H02M 3/1584 363/132 |
| 2014/0254216 A1* | 9/2014 | Diedrichs | H02J 3/00 363/34 |
| 2016/0248315 A1* | 8/2016 | Basic | H02M 7/493 |
| 2016/0352250 A1* | 12/2016 | Lee | H02M 7/493 |
| 2017/0284370 A1 | 10/2017 | Gensior | |
| 2018/0269771 A1* | 9/2018 | Mori | H02M 7/53871 |
| 2020/0350836 A1* | 11/2020 | Geske | H02M 7/4835 |

FOREIGN PATENT DOCUMENTS

| | | |
|---|---|---|
| CN | 102739152 A | 10/2012 |
| CN | 105162350 A | 12/2015 |
| DE | 4023207 C1 | 4/1991 |
| DE | 102014219052 A1 | 3/2016 |
| EP | 0600312 A2 | 6/1994 |
| JP | H03235672 A | 10/1991 |
| JP | 2906616 B2 | 6/1999 |
| JP | 2000092863 A | 3/2000 |
| JP | 2012217330 A | 11/2012 |
| RU | 44901 U1 | 3/2005 |

OTHER PUBLICATIONS

Li et al., "*Use of Hybrid PWM and Passive Resonant Snubber for a Grid-Connected CSI*," IEEE Transactions on Power Electronics, 25(2):298-309, Feb. 2010.

Moin, V.S., "Stabilized Transistor Converters," Moscow, ENERGOATOMIZDAT, pp. 38-42, 1986, 378 pages. (with English Machine Translated Abstract).

\* cited by examiner

INVERTER AND METHOD FOR GENERATING AN ALTERNATING CURRENT

BACKGROUND

Technical Field

The present invention relates to a method for generating an alternating electric current and it also relates to a method for feeding electrical power into an electrical supply network. The present invention furthermore relates to an inverter for generating an alternating current and the present invention relates to a wind power installation having an inverter for generating an alternating current. The invention also relates to an infeed arrangement having a plurality of inverters.

Description of the Related Art

Alternating electric current is generated, for example, in order to be fed into an electrical supply network. This is usually effected in a three-phase manner. Particularly modern wind power installations use inverters for this purpose, which inverters convert electrical power, which has been obtained from the wind, to an alternating current, which is suitable for feeding into an electrical supply network.

The more power that is intended to be fed into the electrical supply network here, the greater the current to be fed in also has to be selected and hence generated. It has already been known for a long time to connect a plurality of inverters in parallel in order that they superpose their individual currents to form a total current that is to be fed in. Such superposition can appear as a plurality of inverters being connected in parallel at their current output so that the individual currents of the individual inverters are added together as a result. Since each inverter generates the alternating current itself by way of a switching method, for example by way of a pulse-width modulation or by way of a tolerance band method, harmonics can occur on the respectively generated currents. If the inverters operate independently of one another, said harmonics can be superposed advantageously or disadvantageously.

In order to eliminate this problem, German patent application DE 10 2014 219 052 has already proposed coordinating the individual modulation methods of the plurality of parallel-connected inverters with one another.

An increase or improvement in the current generation or current modulation of each individual inverter is not yet immediately achieved thereby. In this case, there is also the need to generate generally even higher currents using an inverter.

In principle, an increase in power in an inverter can also be achieved by virtue of the fact that the current that is to be modulated is generated using a significantly higher voltage in order thereby to achieve the higher power not, or not only, through an increase in current but through an increase in voltage. As an alternative or in addition, it is also considered to design the respective inverter entirely in principle for the generation of higher currents. In both cases, however, accordingly modified semiconductor switching elements, particularly IGBTs, which can withstand the higher voltage, or the higher current, would be necessary. However, the use of such improved semiconductor components is regularly costly when there is a departure from values that are usual for current as well as voltage. Custom-made products or at least semiconductor components with a lower number of pieces then regularly have to be used. The behavior of such components is also regularly less known and therefore the overall behavior of the inverter that is to be designed anew can be predicted less well.

The German Patent and Trademark Office has searched the following prior art in the priority application relating to the present application: DE 40 23 207 C1, DE 10 2014 219 052 U1 and US 2007/0273338 A1.

BRIEF SUMMARY

The generation of an alternating current in an inverter can be improved with respect to harmonics and/or with respect to efficiency. A method for generating an alternating electric current is thus proposed. Accordingly, a plurality of component currents are generated and superposed to form a summation current. Each component current is modulated by voltage pulses and the voltage pulses are generated for each component current by a switching means or switch. For this purpose, the switching means switches between different input voltages, as a result of which the voltage pulses are generated. It is particularly possible here to switch between a positive and a negative voltage of a DC voltage intermediate circuit. Each component switching means can be one of three branches of what is known as a B6 bridge. In the case of, for example, two component switching means, these are of course two branches of different B6 bridges, and each of the same phase here.

Despite the reference to the practically used B6 bridge, however, the following explanations are intended initially to explain the basic functioning in single phase. These basic concepts can then be applied analogously to a three-phase system. Further explanations regarding this will also be given later.

A plurality of component currents are thus superposed, specifically summed, to form a summation current. The generation of the voltage pulses is based in principle on what is known as a tolerance band method. However, it is proposed here that a tolerance band is specified for the summation current and the tolerance band has an upper and a lower tolerance limit. That is to say that here it is not the case, as was the previous case, that a tolerance band is specified for each component current and said component current is modulated accordingly, but instead a tolerance band is specified for the sum of said currents, that is to say a tolerance band is specified for the summation current.

The summation current is now detected and the switching of each component switching means is controlled to generate the voltage pulses for modulating the component current depending on the detected summation current with respect to the tolerance band. That is to say that the summation current is detected, specifically with respect to the tolerance band, which, graphically, lies, or is at least intended to lie, around said summation current. It is monitored here, in particular, to determine whether the summation current reaches the upper or lower tolerance limit.

In any case, the summation current is thus detected and set with respect to the tolerance band, but the component switching means is switched as a consequence. Figuratively speaking, the component currents are thus switched or modulated. In this case, the component switching means are not switched synchronously. Nevertheless, it is possible for situations in which two or more component switching means are switched at the same time to arise but the overall method does not make provision for the component switching means to be switched synchronously. In this case, synchronous switching is to be understood as meaning not just simultaneous switching but also switching in the same direction.

That is to say that if, for example, a component switching means switches from a high to a low voltage, particularly from a positive to a negative voltage, and if another component switching means simultaneously switches from the negative to the positive voltage, this is not to be understood as meaning synchronous switching. Synchronous switching would be when the two component switching means, mentioned by way of example, switch at the same time from the positive voltage to the negative voltage, mentioned by way of example, which is intended to be avoided in the proposed method, at least is not predominantly intended to take place.

Consequently proposed is a method that is guided by a known tolerance band method but that provides a tolerance band for a summation current, which in turn triggers switching of component switching means for component currents of the summation current.

Preferably, at least one component switching means is switched when the detected summation current reaches the upper or the lower tolerance limit. Preferably, at least one of the component switching means is selected for switching and the selection is effected depending on a selection function that evaluates the component currents. This is effected, in particular, so that when the detected summation current reaches the upper or lower tolerance limit, a component switching means switches and the selection of which component switching means switches is effected so that, from those component switching means that are considered for switching, that component switching means whose component current is presently the greatest in terms of magnitude is selected. Here, in each case, only the component switching means whose switching presently also gives reason to expect a change in the summation current in the correct direction are considered. When, for example, the summation current is to be reduced, only the switching means whose switching also reduces the component current thereof are considered. That is to say that, in this example, consideration is given only to the switching means that are presently switched to the high or positive voltage and consequently presently can be switched down to a lower or negative voltage in order thereby to trigger a decrease in current.

If the summation current is composed of two component currents, to mention a simple example, and if the summation current reaches the upper tolerance limit, and if the two switching means are switched up to the high or positive voltage, a check is carried out to determine whether the first or the second component current is greater. If the first component current, which is namely generated, that is to say modulated, by the first component switching means, is greater, said component switching means is switched, namely in the example, from a switch position of high or positive voltage to a switch position of low, or negative, voltage. If the second component current were greater, the second component switching means would switch accordingly. In principle, switching from a positive to a negative voltage is effected here in an expedient manner. In theory, however, a potential-free consideration can also be effected so that the positive and negative voltage could then be referred to as high or low voltage. Subsequently, however, switching between positive and negative voltage is assumed for explanation purposes, which can also be referred to as switching from an upper to a lower position.

In any case, this now achieves a situation in which the summation current is considered as a whole, which has the advantage, entirely in principle, that the summation current is also controlled and therefore it can be ensured directly using the control process that the summation current also remains in the tolerance band. Despite considering the summation current, however, component switching means and hence as a result component currents are switched when this is sufficient to achieve the desired change in current of the summation current. As a result of the fact that, when the summation current reaches a tolerance limit, one switch is switched first, synchronous switching is prevented. As a result, harmonics can also be reduced. If it is not sufficient when only one component current is switched, both components current are switched. The decision regarding this is made based on a criterion that also includes the measured network voltage.

In this respect, the summation current is generated by means of a tolerance band for the summation current and furthermore by means of a further criterion, which is namely based on the mentioned selection function that evaluates the component currents.

It is preferably proposed that at least one difference current is detected as the difference between two component currents and the switching in the component switching means is effected additionally depending on the difference current. In the illustrative and otherwise preferred example of two component currents, this difference would be the difference of the two component currents. As a result, it is additionally possible to evaluate and take into account how great the two component currents are with respect to one another. For this purpose, it is preferably ensured that said component currents are on average of the same magnitude and that the difference is thus on average zero.

Said process of taking account is preferably effected so that a difference band, which has an upper and a lower difference limit, is specified for the difference current. When the difference current now reaches the upper or lower difference limit of said difference band, it is proposed, for this embodiment, that at least two of the component switching means are switched opposite to one another, that is to say swap their position, when said switching position can be combined with the reaching of the control target for the summation current.

To address the above example again, in which the summation current is composed of two component currents, one of the component switching means is switched, in principle, with a higher priority when the total current has reached one of the two tolerance limits. That is to say that, if the total current reaches the upper tolerance limit, for example, while two component switching means have switched to the positive voltage, the component switching means of the then greater component current according to magnitude switches from the positive to the negative voltage, that is to say from the upper position to the lower. As a result, this leads to said first component current mentioned by way of example decreasing again and hence also the summation current decreasing. The summation current is thus kept in the tolerance band. As a result of the fact that said first component current now drops again, whereas the other component current does not drop or at least does not drop this far, the difference current also changes accordingly. If the difference current reaches one of the two difference limits here, the two component circuits are switched opposite to one another. Figuratively speaking, said two component circuits swap their switch position. The exemplary switch position, in which the first component circuit is in the lower position and the second component circuit is in the upper position, is changed to the situation in which the first component circuit is in the upper and the second component circuit is in the lower position. The result is that the first component current will then rise again and the second component current will then fall. However, this ought to make no significant difference to the summation current.

The summation current can thus be controlled thereby in such a way that it remains in the tolerance band. At the same time, the component currents, in this case two component currents according to the example, can be controlled so that they are on average of the same magnitude. That is to say, despite individual switching of the particular component currents or the switching means of the particular component currents, it is prevented that, for example, one of the component switching means dominates the summation current or the modulation thereof on account of slight asymmetries of the two component switching means. At the same time, permanent synchronous switching of a plurality of component switching means is prevented in order to keep harmonics low.

According to a further embodiment, it is proposed that it is monitored whether, after reaching the upper or lower tolerance limit and after switching of one of the component switching means triggered thereby, the summation current has not left the tolerance band. If this case that the summation current has indeed left the tolerance band should arise, at least one further component switching means is switched.

To address the above example, when the summation current reaches the upper tolerance limit, the first component switching means mentioned by way of example would then switch from the upper position to the lower position, that is to say would switch down. If this leads, contrary to the explanation given above, to the summation current indeed leaving the tolerance band, the second component switching means will also switch down.

Said monitoring can preferably also be carried out so that a control band surrounding the tolerance band is provided. The control band is thus greater than the tolerance band and has an extended upper limit and an extended lower limit. The extended upper limit lies above the upper tolerance limit and the extended lower limit lies below the lower tolerance limit. If the summation current now reaches the extended upper limit, the at least one further component switching means is switched. The same applies analogously in the case of a departure from the tolerance band to below in that, namely, when the extended lower limit is reached, the further component switching means switches, namely so that at least two component switching means are subsequently switched up.

A spacing of the difference band between the upper and lower difference limit is preferably greater than a spacing of the tolerance band between the upper and lower tolerance limit for the summation current. That is to say that the difference band is wider than the tolerance band for the summation current. This particularly achieves a situation in which switching depending on the summation current in the tolerance band is triggered more often than switching on account of the position of the difference current in the difference band.

Preferably, a ratio of the spacing of the tolerance band to the spacing of the difference band is specified and can be set as a band ratio. In particular, said band ratio can be set to a value greater than 1.5, in particular greater than 2, or can be specified as such a value. Preferably, the band ratio is dependent on the operation, on measurement values, or on system states.

According to one embodiment, it is proposed that the tolerance band and/or the difference band are variable, in particular in that the upper and lower tolerance limit are variable individually or together and/or that the spacing of the tolerance band between the upper and lower tolerance limit and/or the spacing of the difference band between the upper and lower difference limit are variable. Owing to the change in the tolerance band, it is possible to influence the generation of the summation current. If, for example, the tolerance band is displaced overall, that is to say up, for example, the generated summation current can also be displaced upward overall as a result.

The tolerance band can also be displaced up in a positive half-wave of a sinusoidal function that is to be generated and displaced down in the negative half-wave in order to have an influence. Particularly, said change or another change in the tolerance band can be coordinated with further likewise operating inverters in order to thereby influence a total current, which is composed of a plurality of summation currents of said inverters. The switching frequency can be changed through a change in the spacing of the tolerance band and hence through a widening or narrowing of the tolerance band; the same applies to the difference band. The narrower the tolerance band, the higher the switching frequency that results.

The upper or lower tolerance limit can also be changed individually, that is to say independently of one another, in order to influence the summation current as a result.

According to one embodiment, it is proposed that each component switching means has a current output for outputting the component current and an electrical inductor for conducting the component current is arranged at the current output and the inductors are magnetically coupled. The inductors are used particularly for the case that the voltage pulses lead to a current. Each component switching means can thus provide voltage pulses, or can contribute to same and lead same through the inductor, which is connected downstream, to the corresponding component current, which, expressed simply, is reminiscent of a sinusoidal profile with a superposed sawtooth. In the case of inverters, these inductors form comparatively large and hence expensive components. Owing to the magnetic coupling of a plurality of such inductors, which can also be referred to as output inductors, the overall magnitude of each individual inductor can be at least somewhat reduced. Particularly when using two component switching means, it is proposed to use two magnetically coupled inductors. Two component switching means consequently use a magnetically coupled double inductor at their outputs.

A further embodiment is characterized in that a plurality of component switching means are combined to form an inverter apparatus and the inverter apparatus outputs the summation current as output current. That is to say, in principle, a plurality of component switching means form an inverter. At this juncture, it should be mentioned again that the principle has initially been explained for single phase. When an inverter is used for a plurality of, particularly two, component switching means, these should be provided in triplicate, namely once for each phase. In the case of two component switching means for a summation current in the single-phase case, 6 component switching means would consequently have to be provided in the three-phase case. Said 6 component switching means can be embodied in said three-phase case as two B6 bridges.

There is now provision for a plurality of such inverter apparatuses to be connected in parallel and for their output currents, that is to say the individual summation currents, to be superposed to form a total current. There is provision, in particular, for the total current to be fed into an electrical supply network. An overall very large current can consequently be generated through said parallel connection, namely the mentioned total current. In this case, the individual summation currents that are superposed to form said total current can be generated in the advantageous manner explained. In particular, said summation currents can be controlled well by said modified tolerance band method, which also leads to a correspondingly improved total current. Furthermore, the proposed method also makes it possible to coordinate the individual inverter apparatuses, which are connected in parallel here, with one another.

According to one embodiment, it is proposed that in each case two component switching means are combined to form an inverter apparatus so that exactly two component currents are superposed to form a summation current, wherein, in particular, each inverter apparatus has two magnetically coupled inductors as output inductors. It has been identified that two component switching means can be combined in a simple and efficient manner in order to be able to achieve current doubling in the summation current through the generation of two component currents as a result. The outlay in terms of control technology for two such component circuits is in this case comparatively low, wherein an improvement in the quality can be achieved at the same time, in particular with respect to harmonics. In this case, such current doubling can be achieved through connection of basically known and established electronic components. At the same time, this can also be combined well with a double inductor, which consists of two magnetically coupled inductors.

According to a still further preferred refinement, it is proposed that the method is characterized in that two component circuits interact so that they generate two component currents, which are superposed to form a summation current and each of the two component circuits can switch between an upper and a lower switch position. In this case, the summation current increases when both component switching units are in the upper switch position and hence together assume a positive position. This is consequently referred to hereinafter as positive position. The summation current decreases when both component switching units are in the lower switch position and hence together assume a negative position. The fact that the two switching units are in the lower switch position is consequently referred to hereinafter as negative position. The summation current does not change or changes little when the two component switching units are in different switch positions and hence together assume a neutral position. That is to say there may be one component switching unit in an upper and the other in a lower switch position, or vice versa. Both are referred to here as a neutral position.

Through the use of exactly two component circuits, it is consequently possible to provide in a simple manner said three positions, namely the positive, the negative and the neutral position in between.

Preferably, on the basis thereof, to modulate the summation current, it is possible to select between an upper three-point operation, a lower three-point operation and a two-point operation. In this case, for the upper three-point operation, there is switching between the positive and the neutral position. This corresponds in principle to the example mentioned above in which the summation current has reached the upper tolerance limit and one of the two component switching means has then switched down. There has namely been a switch here from the positive to the neutral position as a result.

In the lower three-point operation, there is switching between the negative and the neutral position. This thus corresponds analogously to the upper three-point operation, wherein, however, there is a switch down from the neutral position and back, which characterizes the lower three-point operation. In the two-point operation, there is switching between the positive and the negative position. This means that the two switching units are switched from an upper position to a lower position. When said two-point operation is selected, there is indeed synchronous switching. Said two-point operation is therefore to be kept as short as possible in comparison to the two three-point operations.

Consequently, owing to this specific switching of the two component switching means, a mode of operation in the three-point operation has now been produced overall, in which namely it is possible to alternate between upper and lower three-point operation depending on requirements. This corresponds in principle to a conventional three-point operation, in which three switch positions are possible, namely upper, middle and lower, to express it clearly. In the case of an input-side DC voltage intermediate circuit having a center point, it is possible to switch here between positive voltage, negative voltage and the center point. In the method proposed here, it is not possible to switch between the center point, but the neutral position is achieved here by virtue of the fact that one switching means is switched up and one is switched down.

In other words, a three-point operation is consequently achieved by accordingly two component switching means, which each operate independently in two-point operation. Each component switching means independently is intended to or can namely assume no neutral position according to this proposal. The two component switching means can together produce a three-point operation, however. Said three-point operation could also be achieved by a single component switching means, which can assume a neutral position. However, said component switching means, that is to say, in particular, the semiconductor components involved therein, in particular semiconductor switches, would have to be designed to be larger and there would also be a lower switching frequency, or said component switching means would itself have to switch at a higher frequency.

Preferably, modulation in the two-point operation is carried out in a transition from modulation in the upper three-point operation to modulation in the lower three-point operation. In this case, said transition region is preferably kept as small as possible in order that asynchronous switching operations predominate. In said transition region, it is advantageous to select the two-point operation in order to ensure that the control task with respect to the summation current can always be guaranteed.

There is preferably a selection between the modulation in the upper three-point operation and the modulation in the lower three-point operation and possibly the modulation in the two-point operation depending on a network voltage of an electrical network, which is intended to receive a supply, and/or depending on a phase position of the summation current with respect to the network voltage. In principle, due to the switching positions of the component switching means, voltages are provided, namely actually at the respective output inductor, for example at an input-side connection point of the inductor. If said component circuit is intended to feed into the electrical supply network, the network voltage or the transformed network voltage of the electrical supply network is applied at the other connection point, that is to say, for example, an output-side connection point of the inductor. The voltage that is consequently applied from the first to the second connection point by means of the inductor consequently also depends on the network voltage. It should be noted that this is a simplified explanation and, in particular, the voltage at the two output-side connection points can also depend on further factors than just the network voltage. Which of the mentioned three modulations is expedient at the respective moment consequently depends on the network voltage. The desired phase position of the summation current likewise plays a role, that is to say whether, how far and in which direction the ideal sinusoidal profile of the summation current is intended to be displaced with respect to the profile of the voltage, which is hopefully as sinusoidal as possible.

According to a further refinement, it is proposed that each component switching means generates a three-phase component current and, in particular, each inverter circuit outputs a three-phase summation current. The explanations given altogether above regarding the principle of operation with reference to a single-phase current are consequently expediently applied to the individual phases of a three-phase current. Preferably, a plurality of component switching means are combined in an inverter apparatus, which in simple fashion can also be referred to as inverter or inverter cabinet, and then output a three-phase summation current. An inverter that outputs a three-phase summation current can accordingly be provided in a simple manner and using the advantages mentioned above. Said inverter is particularly well suited for feeding into an electrical supply network, in particular for superposing using further summation currents.

It is preferably proposed that each three-phase current, that is to say, in particular, both each three-phase component current and each three-phase summation current, is transformed to a transformed system and that the difference currents in the transformed system are calculated. It is thus proposed that differences of transformed variables are formed and taken into account for the calculation of a difference current. In principle, different known transformations of a three-phase system can be used. A $\alpha/\beta/0$ system is preferably used as the transformed system.

As a result, a simplified calculation for taking a three-phase system into account can be performed.

It is consequently also preferably proposed that the summation current or a or the total current composed of a plurality of summation currents is fed into an electrical supply network so that the method for generating an alternating electric current is configured as a method for feeding electrical power into an electrical supply network. To feed electrical power into the electrical supply network, particularly when said electrical power is generated by a wind power installation, a method according to at least one of the embodiments described above and that is particularly well suited thereto can be used.

According to the invention, an inverter for generating an alternating electric current is also proposed. Said inverter comprises at least one DC voltage intermediate circuit having a first and a second DC voltage. Said DC voltage intermediate circuit can, for example, obtain its power or its energy with the aid of a rectifier and a generator of a wind power installation.

The inverter also comprises a plurality of component switching means, which are each prepared to generate a component current. Each component switching means thus generates a component current. To this end, each component switching means is prepared to modulate the component current by voltage pulses by virtue of the component switching means being prepared to generate the voltage pulses by switching between the first and second voltage. Said first and second DC voltage consequently correspond to the upper and lower voltage described above or the positive and negative voltage described above. These terms can be used synonymously for the purpose of explanation. Each component switching means can thus generate a pulse pattern from the DC voltage in order to thereby generate an alternating current. For example, a DC voltage circuit, which all of the component switching means can access, can be provided, or it is also considered that a separate DC voltage intermediate circuit is provided for each component switching means.

Furthermore, a superposition means for superposing the component currents to form a summation current is provided. Said superposition means can be realized, for example, by a link point at which the individual component currents are added. In particular, such a link point can be provided on the output side of output inductors of the component switching means.

Furthermore, a process computation means, particularly a process computer, is provided to specify a tolerance band for the summation current having an upper and a lower tolerance limit. A method based on a tolerance band method can therefore be prepared.

Furthermore, the inverter comprises a control means prepared to control each component switching means depending on the detected summation current and depending on the tolerance limit. The component switching means are consequently controlled depending on how the summation current is located in the tolerance band, in particular whether it touches the upper or lower tolerance limit.

In this case, it is proposed that the control means is functionally connected to the process computation means in order to control the component switching means in a manner guided by the process computation means. In particular, switching states can be calculated by the process computation means, in particular, depending on the detected summation current and depending on the tolerance limit, which switching states the control means then implements. In particular, the control means actuates each component switching means individually in order to implement the switching states calculated by the process computation means. To this end, the control means can particularly actuate individual semiconductor switches of the component switching means, in particular IGBTs.

Furthermore, the process computation means and the control means are prepared so that the plurality of component switching means are switched at least partly, in particular predominantly, in a manner asynchronous with respect to one another. For this purpose, the process computation means particularly calculates the appropriate switch positions so that the predominantly asynchronous switching of the switching means is observed. The control means then implements said switching by actuating the individual component switching means, particularly by actuating the individual semiconductor switches.

The inverter also has an output means for outputting the summation current as the alternating current that is to be generated. The summation current is consequently the alternating current that the inverter is intended to generate. The output means can be provided, in particular, as a connection terminal and can be electrically connected to the superposition means.

The inverter is preferably prepared, in particular the process computation means thereof is prepared, to execute a method according to one of the above embodiments. Furthermore, or alternatively, said inverter is prepared to be coupled to further similar inverters, in particular so that the output summation current is superposed with further summation currents to form a total current. In this respect, the inverter is also prepared to execute the embodiments described above in which a plurality of summation currents are superposed to form a total current.

The inverter is preferably characterized in that an inductor is interconnected between each component switching means and the superposition means and said inductors are magnetically coupled. There are consequently as many inductors present as component switching means and said inductors are magnetically coupled. Said inductors are thus arranged so that each component current of the component switching means reaches the superposition means via the inductors and also from there further to the output means. Magnetic coupling can be effected, for example, so that the inductors are arranged on a common magnetic core.

According to one embodiment, it is proposed that the inverter has exactly two component switching means and consequently generates exactly two component currents, which are superposed to form a summation current. In the preferred three-phase case, said inverter consequently has two three-phase component switching means. The two three-phase component switching means can also be referred to as 6 single-phase component switching means, of which in each case two generate two single-phase component currents in pairs, which currents form one single-phase summation current and thus three single-phase summation currents are generated overall, which together form one single-phase summation current. Such an inverter is therefore particularly well prepared to implement the method described above according to embodiments, which likewise generate and superpose exactly two component currents.

According to the invention, an infeed arrangement having a plurality of inverters is also proposed. To this end, inverters according to at least one of the embodiments described above are combined. In this case, the inverters are connected in parallel at their output means, at which they each thus output the summation current, in such a way that the summation currents are superposed to form a total current. A method, which has been described above according to at least one embodiment for superposing a plurality of summation currents to form a total current, can therefore also be implemented accordingly.

The infeed arrangement is preferably characterized in that the inverters, in particular the process computation means thereof, are coupled among one another in order to exchange information in order to coordinate the generation of the summation currents between the inverters. The summation currents generated by the described methods or the described inverters are already well suited to being superposed. The superposition of the summation currents can also additionally be improved by such communication of the inverters among one another.

According to the invention, a wind power installation is also proposed. Such a wind power installation has an aerodynamic rotor and a generator in order to generate electrical power from wind. To feed the power as electric current into an electrical supply network, the wind power installation has at least one inverter according to an embodiment described above. Furthermore or alternatively, the wind power installation has for this purpose an infeed arrangement according to an embodiment described above. Power can consequently be generated from the wind using the aerodynamic rotor and the generator and can be provided as DC voltage, in particular, by means of a rectifier. An alternating electric current for feeding into the electrical supply network can then be generated from the DC voltage by way of one or more inverters, which can be combined in an infeed arrangement. The advantages described above in relation to the inverter and to the infeed arrangement and hence the advantages described in relation to the method for generating an alternating electric current can therefore be utilized for the wind power installation.

BRIEF DESCRIPTION OF THE SEVERAL VIEWS OF THE DRAWINGS

The invention is described in more detail below by way of example on the basis of embodiments with reference to the accompanying figures.

DETAILED DESCRIPTION

Figure 1:
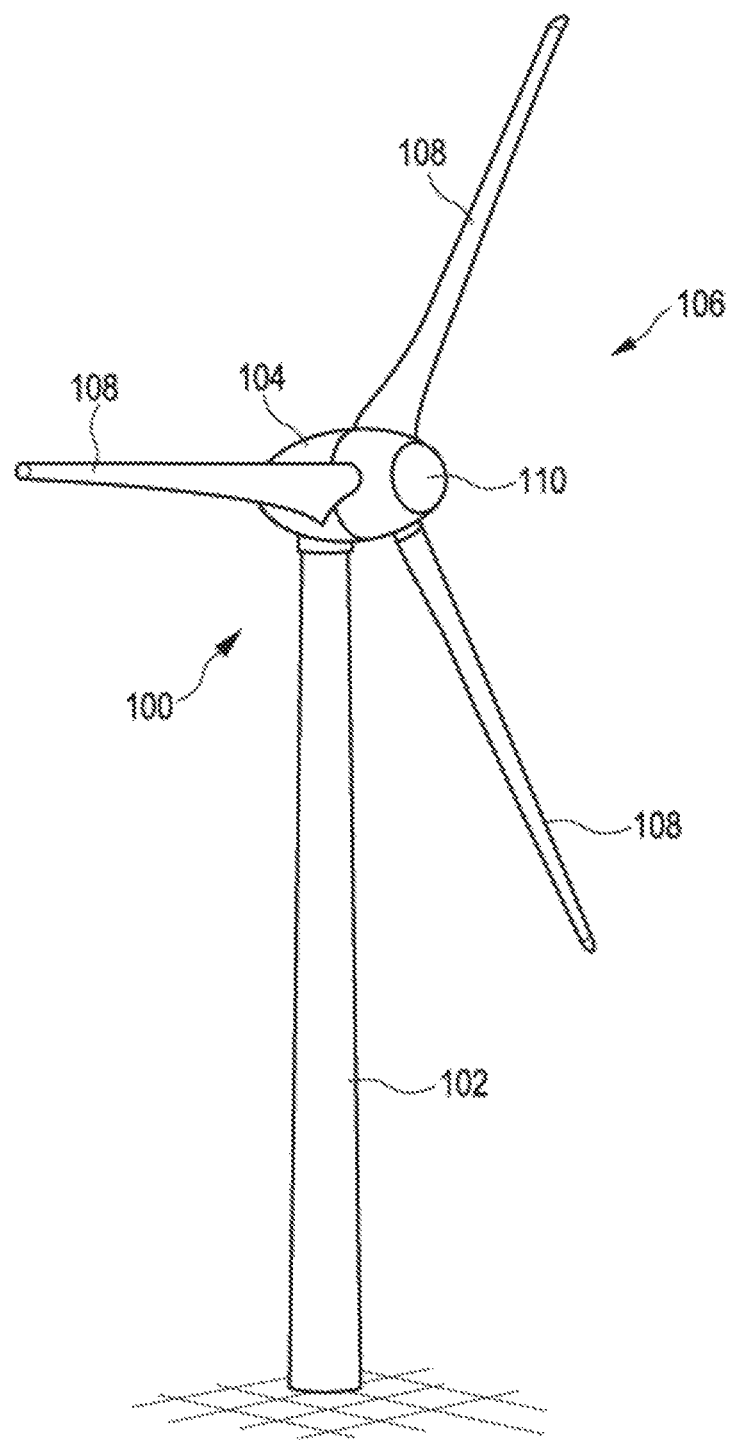
FIG. 1 shows a perspective illustration of a wind power installation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

Figure 2:
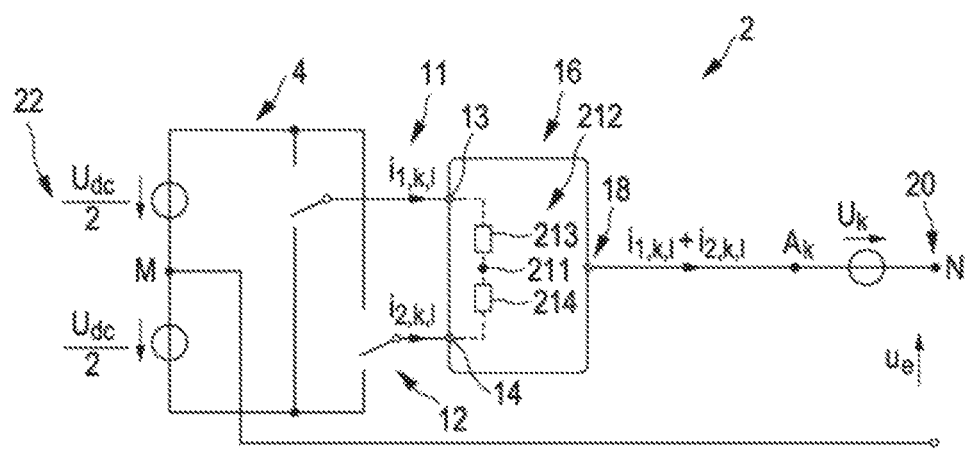
FIG. 2 shows a schematic 1-stranded or single-phase illustration of a model of an inverter having two component switching means.

FIG. 2 schematically illustrates an inverter 2 having a first and second component switching means 11 and 12, respectively. The two component switching means 11, 12 can each switch between an upper voltage 4 or positive voltage 4 and a lower voltage 6 or negative voltage 6. As a result, voltage pulses, which can alternate namely between the upper voltage 4 and the lower voltage 6, can be generated at the first and second voltage node 13 and 14, respectively. For each component switching means 11 and 12, a component current $i_{1,k,l}$ results at the first voltage node and $i_{2,k,l}$ results at the second voltage node 14. Said two component currents $i_{1,k,l}$ and $i_{2,k,l}$ are superposed in the superposition means 16 to form the summation current $i_{1,k,l}+i_{2,k,l}$ and are output at the output node 18 of the superposition means 16. Said summation current is then fed into an electrical supply network at the network node 20, which is denoted by an N. The two component currents and hence also the summation current consequently depend not only on the switching position of the component switching means 11, 12 but also on a voltage in the electrical supply network and in the process on a voltage at the network node 20. In principle, the method for generating an alternating current can also be used, however, for operating an electrical AC motor, for example.

Both component switching means are supplied with power on the input side by a DC voltage intermediate circuit $U_{dc}$, which in this case has a center tap M and is subdivided thereby into two voltages $U_{dc}/2$ of equal magnitude. In this embodiment, both component switching means 11 and 12 are connected to the same DC voltage intermediate circuit 22.

Figure 3:
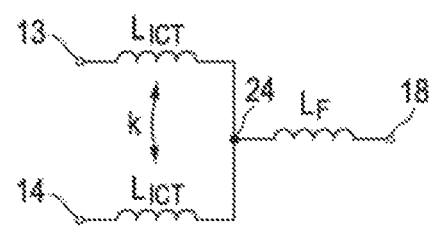
FIG. 3 shows two coupled inductances having a common, non-coupled inductance.

In the superposition means 16, it is possible to superpose the two component currents through two coupled inductances $L_{ICT}$ having a common, non-coupled inductance $L_F$, as is illustrated demonstratively in FIG. 3. The double arrow with the letter k demonstrates the coupling of the two inductances $L_{ICT}$. For example, the two coupled inductances $L_{ICT}$ of FIG. 3 could be connected at the first and second voltage node 13 and 14 in the superposition means 16 of FIG. 2. This is subsequently also taken as a basis for the explanation. For the purpose of demonstration, said two voltage nodes 13 and 14 are also shown in FIG. 3. The non-coupled inductance $L_F$ could accordingly be connected at the output node 18 of the superposition means 16 of FIG. 2 and this reference sign 18 is also shown accordingly in FIG. 3. Nevertheless, this, particularly the explanation of FIG. 3, serves for demonstration.

Each of the coupled inductances $L_{ICT}$ forms an inductor for the first component switching means 11 and the second component switching means 12, respectively.

A voltage at the first voltage node 13 consequently changes as a result of switching of the first component switching means 11. A voltage at the second voltage node 14 likewise changes as a result of switching of the second component switching means 12. Furthermore, a voltage at the connecting node 24 also changes. Expressed simply, the voltage values at the two voltage nodes 13 and 14 are each consequently switched between two values, as a result of which an alternation between three voltages can be produced at the connecting node 24. However, this should only serve for demonstration purposes since, whereas only two voltage values can actually be produced at the two voltage nodes 13 and 14 given a stable voltage of the DC voltage intermediate circuit 22, the voltage at the connecting node 24 also changes of course due to the change in the currents through the inductances shown in FIG. 3.

Figure 4:
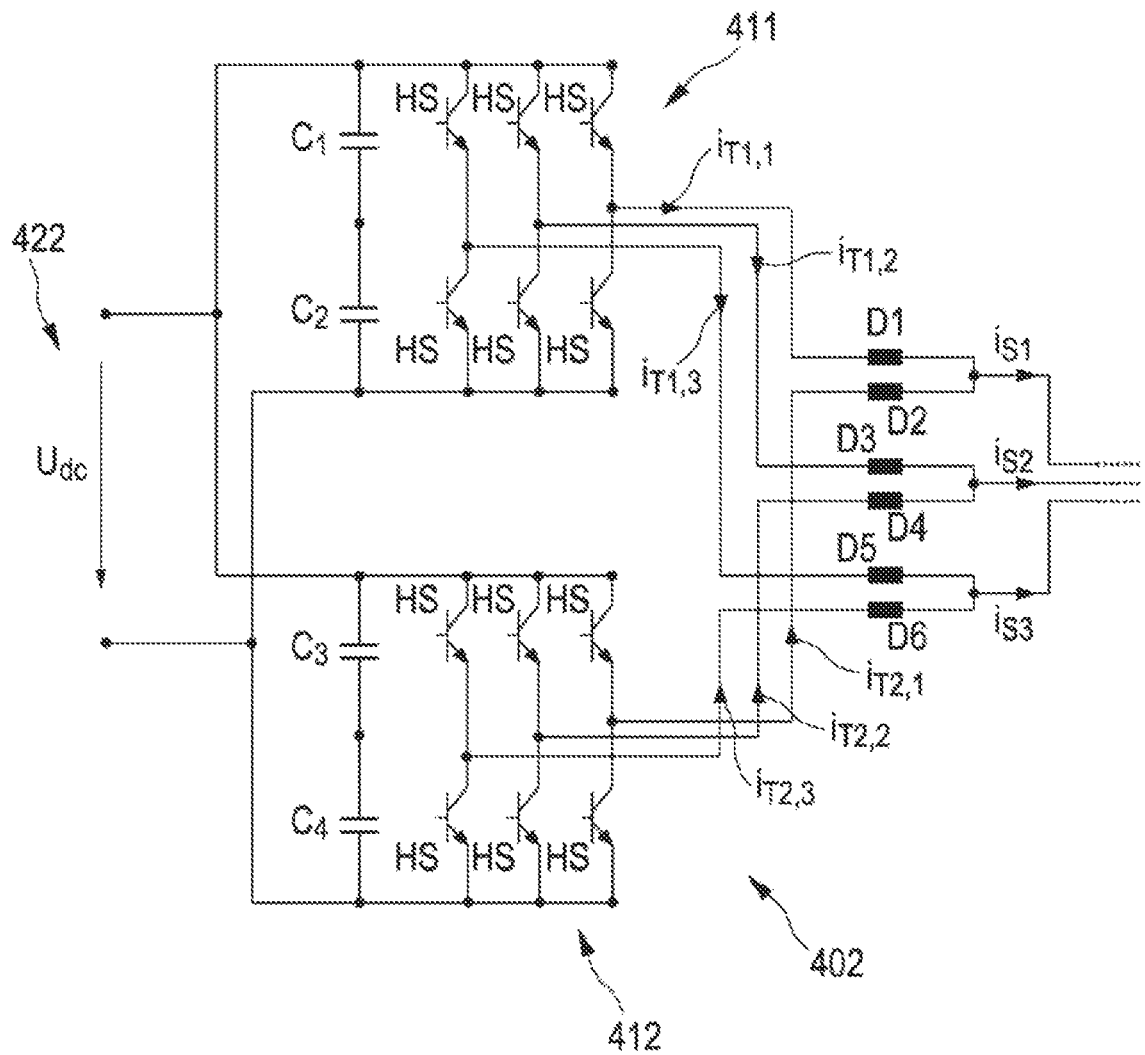
FIG. 4 shows a further schematic illustration of an inverter.
Figure 4:
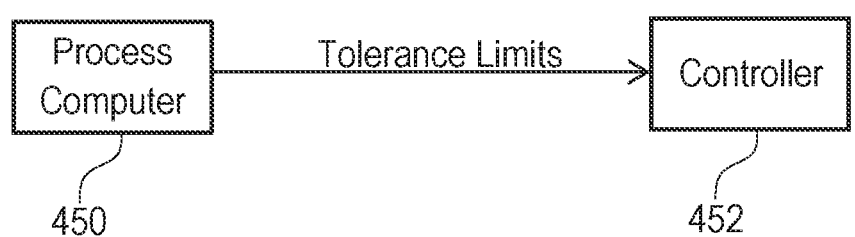

FIG. 4 schematically shows an inverter 402, which is embodied in a three-phase manner. The inverter 402 also has a first and a second component switching means 411 and 412, respectively. Said two component switching means 411 and 412 each have a B6 bridge, which is illustrated only schematically, namely substantially by the six semiconductor switches HS. Further details, such as actuation lines or freewheeling diodes, are not illustrated for the sake of simplicity and, besides, a B6 bridge including the actuation thereof is known in principle to those skilled in the art. In any case, a respective branch having two semiconductor switches HS forms a switching element for a phase.

The first component switching means 411 accordingly generates a component current $i_{T1,1}$, $i_{T1,2}$ and $i_{T1,3}$, respectively, for each phase. The second component switching means 412 likewise accordingly generates a component current $i_{T2,1}$, $i_{T2,2}$ and $i_{T2,3}$, respectively, for each phase. All of these component currents flow in each case through one of the six inductors D1 to D6 in order to then be superposed to form one of the summation currents $i_{s1}$, $i_{s2}$ and $i_{s3}$, respectively. The three summation currents $I_{s1}$ to $I_{s3}$ together form a three-phase summation current, which can be fed into an electrical supply network, possibly after prior superposition with further three-phase summation currents.

As power supply, both component switching means 411 and 412 receive a DC voltage intermediate circuit voltage $U_{dc}$ at a DC voltage intermediate circuit 422. Furthermore, intermediate circuit capacitors C1 to C4 are provided for voltage smoothing.

The inductors D1 to D6 can be magnetically coupled in pairs so that the inductors D1 and D2 are coupled, the inductors D3 and D4 are coupled and the inductors D5 and D6 are coupled. It is also considered that the inductors D1 to D6 form two coupled three-phase inductors.

A process computer 450 is provided to specify a tolerance band for the summation current having an upper and a lower tolerance limit. Furthermore, the inverter 402 comprises a control means 452 prepared to control each component switching means depending on the detected summation current and depending on the tolerance limit.

Figure 5:
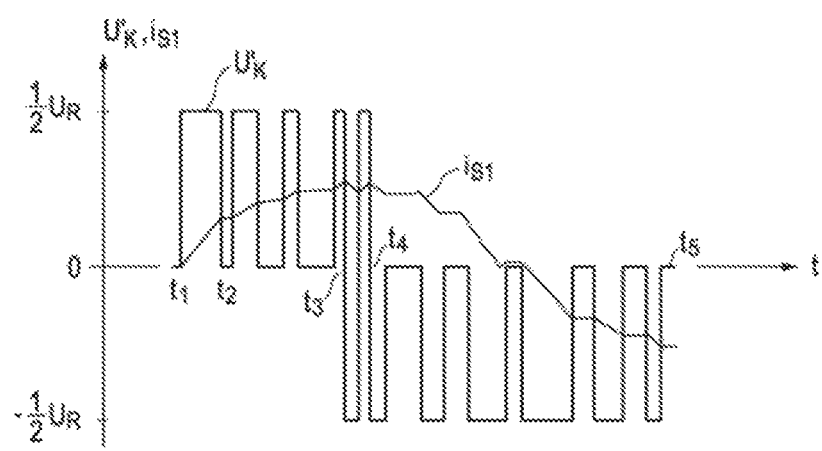
FIG. 5 illustrates a pulse pattern for demonstrating a method according to the invention.

FIG. 5 illustrates a section of a schematic illustration of a possible kind of modulation of a summation current. By way of example, a first summation current $i_{s1}$ is shown here as summation current. To demonstrate voltage pulses, an illustrative profile of a voltage $U'_K$ is shown for the purpose of explanation. Said voltage profile $U'_K$ cannot actually be directly physically measured. It could be made to be able to be measured at the measurement point 211 of the indicated high-impedance voltage divider 212 between the voltage node 13 and 14 according to FIG. 2 using the measurement resistors 213 and 214. However, the voltage divider 212 is not provided and serves only for explanation.

It should be mentioned that said FIG. 5 would like to explain the underlying principle based on a known three-point operation. In fact, it comes down to the generation of the summation current $i_{s1}$. The actual voltage will also be able to be influenced by the current so that the illustration of FIG. 5, according to which the voltage assumes only three values, serves for demonstration.

The component illustration begins at the time $t_1$. At this time, it is assumed that the summation current $i_{s1}$ has approximately the value of 0 and is intended to rise. Positive voltage pulses accordingly dominate initially. The illustration of the voltage profile $U'_K$ accordingly begins with a wide positive voltage pulse. A total voltage region $U_R$ is given as the amplitude, for example, so that the voltage $\frac{1}{2}U_R$ to $-\frac{1}{2}U_R$ is sufficient. In any case, the illustrated positive voltage pulse at the time $t_1$ is the result of both component switching means being switched to a positive or high voltage value by an inverter having two component switching means, as is shown in FIG. 2. If the voltage pulse decreases back to 0, as at the time $t_2$, this means that one of the two component switching means 11 or 12, to refer to FIG. 2, has switched down to a low or negative voltage. Up to the time $t_3$, a positive pulse pattern, which alternates between 0 and $\frac{1}{2}U_R$, is thus generated. This produces an increasing current $i_{s1}$, which increases more weakly as the dominance of the respective positive voltage pulse decreases. Up to the time $t_3$, an upper three-point operation is consequently illustrated, because there is switching only between 0 and a positive voltage.

In any case, at the time $t_3$, there is a switch from the positive voltage pulse illustrated there directly to an illustrated negative voltage pulse and back again shortly after. At the time $t_4$, there is another switch from the positive voltage value directly to the negative voltage value. From the time $t_3$ to the time $t_4$, a two-point operation is consequently present. The component switching means 11 and 12 mentioned here by way of example thus each switch synchronously here. Said two-point operation is consequently intended to be kept as short as possible.

From the time $t_4$, a lower three-point operation then follows, in which there is a switch between the voltage 0 and the negative voltage. This is also to be understood as purely illustrative. Said lower three-point operation is consequently realized so that, in the case of the negative voltage value, the two component switching means 11 and 12 have switched to the lower voltage and, in the case of the value 0, one of said two component switching means 11 and 12 has switched to the upper value. It should be noted that, as explained more below, both in the case of the upper three-point operation between the times $t_1$ and $t_3$ and also in the case of the lower three-point operation between the times $t_4$ and $t_5$, the component switching means 11 and 12 mentioned by way of example can swap their position at phases, particularly in the case of long phases, in which the voltage assumes the value of 0. That is to say that between the component switching means 11 switching to a high voltage and the component switching means 12 switching to a low voltage, it is possible to switch to the state in which the first component switching means 11 is switched to a low voltage value and the second component switching means 12 is switched to a high voltage value, and vice versa.

At the time $t_5$, a short two-point operation could follow again.

It can also be seen in FIG. 5 that said two-point operation is located in the shortest possible transition region between the upper three-point operation and the lower three-point operation or between a lower three-point operation and an upper three-point operation, as would follow at time $t_5$.

The two-point operation does not necessarily have to fall precisely within the region in which the summation current is at a maximum or minimum. The position of said two-point operation also depends namely on the network voltage and the phase position of the summation current with respect to the network voltage.

It is mentioned, purely by way of precaution, that, in reality, significantly more switching pulses are of course selected for a half-wave of a sinusoidal current profile.

Figure 6:
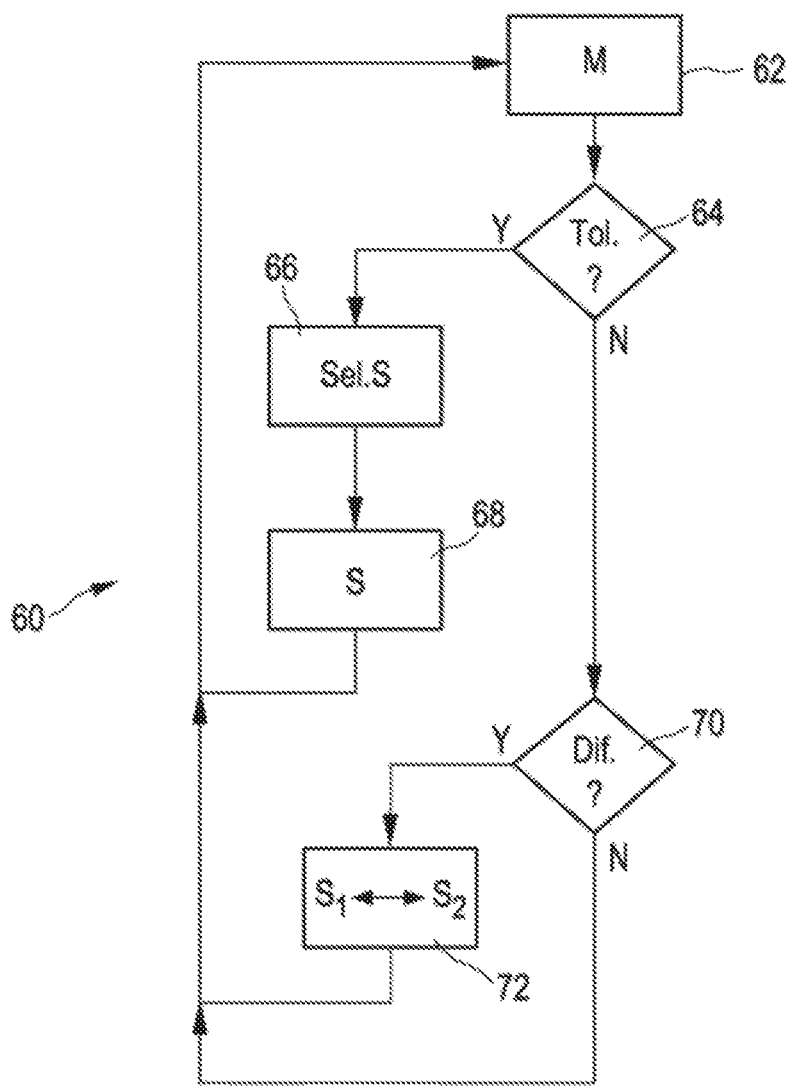
FIG. 6 shows a flowchart for demonstrating a method according to the invention.

FIG. 6 illustrates a procedure for executing the method for generating an alternating electric current. FIG. 6 shows here in a simplified manner a procedure 60, which is run through substantially continuously. The generated component currents and also the summation current superposed therefrom are detected in the measurement block 62. Based on the measurement values, a check is carried out in the tolerance block 64 to determine whether the summation current has reached a tolerance limit. When this is the case, there is a branch-off to the selection block 66, which selects the switch that should be switched. For simplification, an inverter according to FIG. 2 is assumed here. Then there is thus a selection in the selection block 66 as to whether the first component switching means 11 or the second component switching means 12 switches. If the two component switching means 11 and 12 are located in the same position, that is to say both up or both down, the component switching means whose current is greatest according to magnitude is selected. That is to say that if the two component switching means 11 and 12 are switched up and the first component current is greater than the second component current, the first component switching means 11 is switched.

If the two component switching means 11 and 12 are in a different position, that is to say that the inverter is in a neutral position overall, in principle only one switch is considered for switching, namely that one that returns the summation current back to the tolerance band. That is to say that if, for example, the summation current in an upward movement impinges on the lower tolerance limit and if a component switching means is switched up and the other is switched down, the component switching means which is switched down can be switched up so that the current can be increased again as a result.

Said switching is then implemented or initiated in the switching block 68. The loop then basically returns back to the measurement block 62.

When it has been identified in the tolerance block 64 that the summation current does not impinge on a limit of the tolerance band, a check is carried out in the difference block 70 to determine whether a difference current impinges on a limit of the difference band. However, this takes place only when the neutral position is present, that is to say that both component switching means have different positions. If it has been identified that a limit of the difference band has been reached, the switch positions of the first and second component switching means 11 and 12 are changed in change block 72. In this case, it is assumed that the difference current, in any case in this example in which only two component switching means 11 and 12 are present, impinge on a limit of the difference band only when said component switching means have different positions since then the two currents are in opposite directions, which leads to a change in the difference current. If, for example, the difference block 70 should identify that the difference current impinges on a limit of the difference band more often than the tolerance block 64 identifies that the summation current impinges on a limit of the tolerance band, it is proposed to increase the difference band.

In the method for generating the alternating current, an interception circuit is also implemented, which is not, however, present in the flowchart of FIG. 6. Said interruption circuit is constantly active and checks whether the summation current has left the tolerance band to a significant degree. Since the query in the tolerance block 64 is intended to return the summation current back to the tolerance band using the subsequent measures of the selection block 66 and switching block 68, said interruption circuit is not intended to be used in the normal case at all. Nevertheless, it is provided as a precaution. It functions so that a greater band is placed around the tolerance band, which greater band is referred to as control band, and so that a check is performed to determine whether said greater band is reached by the summation current. If this is the case, the summation current has to have left the tolerance band still further after it has already been identified in block 64 that the limits of the tolerance band have been reached and countermeasures of the blocks 66 and 68 have been initiated.

Figure 7:
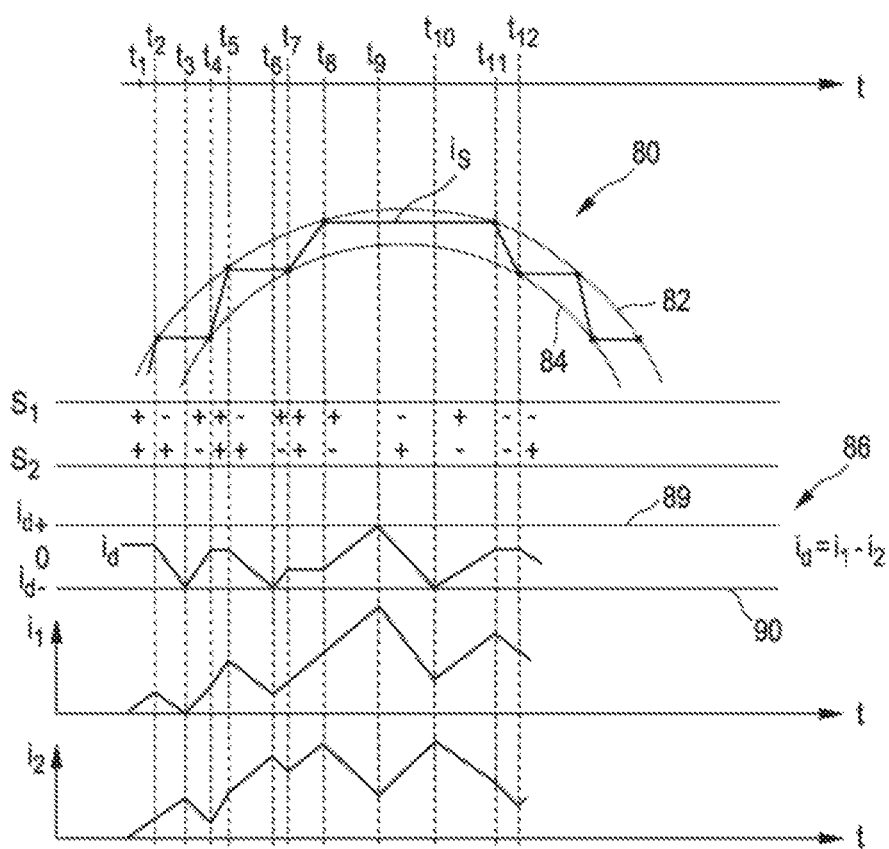
FIG. 7 shows a tolerance band and a difference band for demonstrating a method according to the invention.

FIG. 7 illustrates a simplified example of the switching criteria taken as a basis for the flowchart of FIG. 6. To this end, FIG. 7 shows a tolerance band 80 of a section of a summation current $i_s$. The tolerance band 80 has an upper tolerance limit 82 and a lower tolerance limit 84.

All of the illustrations in FIG. 7 are plotted over time t and the same time axis is taken as a basis for the illustration in FIG. 7. Dimensioning has been omitted but the summation current $i_s$ shows approximately an upper half-wave so that, in the event of a desired sinusoidal profile of 50 Hz, FIG. 7 illustrates approximately a hundredth of a second. However, it does not come down to this accuracy, especially since FIG. 7 reproduces the correlation in only a very simplified manner.

Furthermore, FIG. 7 illustrates the switch positions of the component switching means 11 and 12 as switches S1 and S2. A plus sign indicates that the corresponding component switching means is switched up, namely to an upper or positive DC voltage, and a minus sign indicates that the relevant component switching means is switched down, namely to a lower or negative DC voltage.

Furthermore, under the switch positions, a difference band 86 is shown, having an upper difference limit 88 and a lower difference limit 90.

At the time $t_1$, wherein said times do not correspond to those of FIG. 5, the two component switching means, that is to say the two switches S1 and S2, are switched up and the summation current $i_s$ increases. The two individual currents $i_1$ and $i_2$, which are each plotted in a graph below the difference band 86 as first component current $i_1$ and second component current $i_2$, also increase accordingly. It should be noted that the illustration is schematic and also the scaling of the currents $i_1$, $i_2$ and $i_s$ does not have to correspond exactly. However, the two component currents $i_1$ and $i_2$ are of the same scale in the graph of FIG. 7.

In any case, the two component currents $i_1$ and $i_2$ increase at the time t1, wherein the first component current $i_1$ is slightly greater than the second component current $i_2$.

At the time $t_2$, the summation current $i_s$ reaches the upper tolerance limit 82 of the tolerance band 80. Since the first component current $i_1$ is somewhat greater than the second component current $i_2$, the first switch S1 is switched and consequently changes from plus to minus. The switch position of switch S2 remains unchanged. The first component current $i_1$ then falls whereas the second component current $i_2$ rises further. This leads to the difference current $i_d$ falling. In this case, the difference current $i_d$ is defined here as $i_d = i_1 - i_2$.

Since the sum of the two component currents $i_1$ and $i_2$ is now approximately 0, the summation current $i_s$ does not change and initially has a horizontal profile.

At the time $t_3$, the difference current $i_d$ then reaches the lower difference limit 90. Switches S1 and S2 then swap their switch position. Switch S1 is thus switched up and S2 is switched down. The first component current $i_1$ then increases and the second component current $i_2$ falls. The summation current continues to remain at an approximately constant level here. The difference current rises again. At the time $t_4$, the summation current $i_s$ reaches the lower tolerance limit 84. The second component switch S2 is then switched up so that both component switches S1 and S2 are then switched up again. At the time $t_5$, the summation current $i_s$ then reaches the upper tolerance limit 82 again. In this case, the first component current $i_1$ is again greater than the second component current $t_2$ so that the first switch S1 is switched down.

At the time $t_6$, the difference current $i_d$ as a result reaches the lower difference limit again so that the switch positions S1 and S2 are exchanged. A short time later at the time $t_7$, the summation current $i_s$ reaches the lower tolerance limit and the second switch S2 is consequently switched up again so that both switches are then switched up again.

At the time $t_8$ the summation current $i_s$ reaches the upper tolerance limit 82. This time, the second component current $i_2$ is greater than the first component current $i_1$ and the second switch S2, that is to say the second component switching means 12, is accordingly switched down.

The first component current $i_1$ consequently increases further whereas the second component current $i_2$ falls. This leads to the difference current $i_d$ increasing and, at the time $t_9$, the upper difference limit 88 being reached. Switches S1 and S2 then swap their position. At the time $t_{10}$, the difference current $i_d$ then reaches the lower difference limit 90 and switches S1 and S2 swap their position again.

At the time $t_{11}$ the summation current $i_s$ reaches the upper tolerance limit 82 again and the only switch S1 that is switched up at this moment is accordingly switched down.

At the time $t_{12}$, the summation current $i_s$ reaches the lower tolerance limit 84, whereas both switches S1 and S2 are switched down. At this time, the first component current $i_1$ is greater than the second component current $i_2$. The second switch S2 is accordingly switched up in order to better balance the two component currents $i_1$ and $i_2$.

This kind of circuit accordingly carries on continuously.

This example of FIG. 7, which also serves only for illustration, differs from the example of FIG. 5 in that no two-point operation is carried out in the transition between the upper three-point operation and the lower three-point operation. The illustration of FIG. 7 basically shows an upper three-point operation up to the time $t_8$. At the time $t_8$, the upper three-point operation first assumes a center position, in which namely one of the two switches S1 and S2 are always switched up and one is always switched down. At the time $t_{11}$, there is then a change from said neutral position to the lower three-point operation. It should be noted, however, that this is an illustration for explaining the method. The long region with a constant summation current $i_s$ from time $t_8$ up to time $t_{11}$ ought not to occur in reality because the tolerance band is significantly narrower in reality and as a result the switching frequency is significantly higher.

In the embodiments, a solution that combines, in particular, two component switching means has consequently been described in detail. However, it is also very generally possible to combine a plurality of component switching means without departing from the teaching that is basically taken as a basis.

In principle, a problem that consists in fitting two parallel-connected power sections with approximated sliding-mode controllers so that it acts as a three-point power converter is also taken as a basis here. That is to say that, in particular, both power sections can also have complementary switch positions for each phase.

When such a configuration is fitted with a linear current controller, for example, the converter voltage functions as a manipulated variable. This can then be converted to discrete switching signals by a modulation algorithm, which implements the value prescribed by the controller in an averaged sense. In this case, in practice, all of the voltage levels of the three-point power converter are actually used. However, no sliding modes can thus be achieved, with the result that, for example, worse suppression of disturbances is achieved than is possible in the case of approximated sliding-mode controllers.

In contrast, if an approximated sliding-mode controller, for example a tolerance band controller, is used to control the currents, there are two variants.

According to the first variant, independent current controllers are used for both power sections. In the case of such a realization, all of the voltage levels of the three-point power converter can occur but this happens in an uncontrolled manner. An optional reduction in the average switching frequency would therefore not be possible.

According to the second variant, a current controller for the resulting current of both power sections would be used so that both power sections switch practically in synchronous fashion. The occurrence of complementary switching positions is then practically excluded, which mostly leads, however, to a higher average switching frequency.

These problems have also been recognized. Controlling the resulting current of both power sections and also the differential current is described herein. Tolerance bands can be prescribed independently of one another for the two currents, which has been recognized. In addition, it is intended to ensure, as far as possible, that complementary switch positions also occur for each phase so that the lowest possible average switching frequency is achieved. Furthermore, it is also intended to cover the case when the inductors of both power sections are magnetically coupled to one another.

Concepts of the solution already described herein are, inter alia, that there is a superordinate controller for the summation current and a subordinate controller for the difference current. To control the summation current, the switch combination that leads to the lowest possible switching frequency is then selected. This has also already been described in detail by way of example.

A teaching herein is consequently the perception of the parallel connection of the power sections, which can also be referred to herein synonymously as component switching means, as a three-point power converter from the point of view of the summation current and the design of a controller for this. In the case of the design of the controller, a magnetic coupling of the inductors can then be taken into account.

An advantage herein is that the maximum adjusting range is not utilized immediately, as is often the case in approximated sliding-mode controllers. As a result, the average switching frequency can be reduced and the positive properties of a sliding-mode control process can remain unchanged at the same time, for example, the good suppression of disturbances and the relatively fast reaction capacity.

The invention claimed is:

1. A method for generating an alternating electric current comprising:
generating a plurality of component currents,
superposing the plurality of component currents to form a summation current,
specifying a tolerance band for the summation current having an upper and a lower tolerance limit,
detecting at least one difference current that is a difference between two component currents of the plurality of component currents, and
detecting the summation current, wherein:
each component current of the plurality of component currents is modulated by voltage pulses, and the voltage pulses are generated, for each component current, by a respective plurality of component switching devices, wherein a respective component switching device generates a respective voltage pulse by switching between different input voltages,
the switching of each component switching device of the plurality of component switching devices is controlled to generate the respective voltage pulse for modulating the component current depending on the detected summation current with respect to the tolerance band, and the plurality of component switching devices are switched at least partly asynchronously with respect to each other, and
the switching of the respective component switching device is performed depending on comparing the at least one difference current to a difference band having an upper difference limit and a lower difference limit for the at least one difference current.

2. The method as claimed in claim 1, comprising:
switching at least one component switching device when the detected summation current reaches the upper tolerance limit or the lower tolerance limit.

3. The method as claimed in claim 1, comprising:
selecting at least one of the plurality of component switching devices for switching based on a selection function that evaluates the plurality of component currents such that when the detected summation current reaches the upper tolerance limit or lower tolerance limit, the component switching device having a component current that is presently greatest in magnitude is selected for switching.

4. The method as claimed in claim 1, comprising:
switching at least two of the plurality of component switching devices to opposite states when the at least one difference current reaches the upper difference limit or the lower difference limit.

5. The method as claimed in claim 2, comprising:
monitoring the summation current to determine whether, after reaching the upper tolerance limit or the lower tolerance limit and after switching the at least one component switching device, the summation current does not leave the tolerance band, wherein at least one further component switching device is switched when the summation current leaves the tolerance band as a result of the summation current reaching an extended upper limit or an extended lower limit of a control band that surrounds the tolerance band.

6. The method as claimed in claim 1, wherein a difference between the upper difference limit and lower difference limit of the difference band is greater than a difference between the upper tolerance limit and lower tolerance limit of the tolerance band.

7. The method as claimed in claim 1, wherein the upper tolerance limit and lower tolerance limit are variable, a difference between the upper tolerance limit and lower tolerance limit is variable, or a difference between the upper difference limit and lower difference limit of the difference band is variable.

8. The method as claimed in claim 1, wherein each component switching device has a current output for outputting the component current and an electrical inductor for conducting the component current is arranged at the current output and electrical inductors of the plurality of component switching devices are magnetically coupled.

9. The method as claimed in claim 1, wherein:
the plurality of component switching devices combine to form an inverter apparatus and the inverter apparatus outputs the summation current as an output current, and
a plurality of inverter apparatuses including the inverter apparatus are connected in parallel and their respective output currents are superposed to form a total current for feeding into an electrical supply network.

10. The method as claimed in claim 9, wherein two respective component switching devices of the plurality of component switching devices are combined to form the inverter apparatus so that two component currents are superposed to form the summation current, wherein the inverter apparatus has two magnetically coupled inductors as output inductors.

11. The method as claimed in claim 10, wherein two component switching circuits are configured to:
generate the two component currents, which are superposed to form the summation current, and
wherein each of the two component switching circuits switches between a first position and a second position, wherein:
the summation current increases when the two component switching circuits are both in the first position and together assume a positive position,
the summation current decreases when the two component switching circuits are both in the second position and together assume a negative position, and
the summation current substantially does not change when the two component switching circuits are in different switch positions and together assume a neutral position.

12. The method as claimed in claim 11, comprising:
selecting between a first three-point operation, a second three-point operation and a two-point operation to modulate the summation current, wherein:
in the first three-point operation, switching is between the positive and the neutral position, in the second three-point operation, switching is between the negative and the neutral position, and in the two-point operation, switching is between the positive and the negative position.

13. The method as claimed in claim 12, comprising:
modulating the summation current in the two-point operation includes transitioning from modulation in the first three-point operation to modulation in the second three-point operation.

14. The method as claimed in claim 12, comprising:
selecting between a modulation in the first three-point operation, a modulation in the second three-point operation and a modulation in the two-point operation based on a network voltage of an electrical network receiving an infeed or based on a phase position of the summation current in relation to the network voltage.

15. The method as claimed in claim 9, wherein each component switching device generates and outputs a three-phase summation current, wherein at least one of: the three-phase summation current is transformed to a transformed $\alpha/\beta/0$ system, or a difference current in the transformed system is calculated.

16. The method as claimed in claim 1, wherein the summation current or a total current composed of a plurality of summation currents is fed into an electrical supply network so that the method for generating the alternating electric current is configured as a method for feeding electrical power into the electrical supply network.

17. An inverter for generating an alternating electric current, comprising:
at least one DC voltage intermediate circuit having a first DC voltage and a second DC voltage, and
a plurality of component switching devices, wherein each component switching device of the plurality of component switching devices generates a respective component current of a plurality of component currents, wherein:
each component switching device of the plurality of component switching devices is configured to modulate the respective component current by voltage pulses generated by switching between the first and second DC voltage,
a superposition device superposes the plurality of component currents to form a summation current,
a current detection device detects the summation current,
an output outputs the summation current as the alternating electric current,
a process computer specifies a tolerance band for the detected summation current having an upper tolerance limit and a lower tolerance limit, and
a controller is configured to control each component switching device based on the detected summation current and the upper and lower tolerance limits, wherein:

the controller is operatively coupled to the process computer to control the component switching device in a manner guided by the process computer, the plurality of component switching devices are switched at least partly asynchronously with respect to each other, at least one difference current is detected, the at least one difference current being a difference between two component currents of the plurality of component currents, and the switching of the component switching device is performed depending on comparing the at least one difference current to a difference band having an upper difference limit and a lower difference limit for the at least one difference current.

18. The inverter as claimed in claim 17, wherein the process computer is configured to be coupled to further inverters so that the output summation current is superposed with further summation currents to form a total current.

19. The inverter as claimed in claim 17, wherein an inductor of a plurality of inductors is interconnected between each component switching device and the superposition device and the plurality of inductors are magnetically coupled.

20. The inverter as claimed in claim 17, wherein the inverter has two component switching devices.

21. An infeed arrangement, comprising:
a plurality of inverters including:
the inverter as claimed in claim 17; and
one or more other inverters,
wherein the plurality of inverters are connected in parallel at output devices of the plurality of inverters so that a plurality of summation currents of the plurality of inverters are superposed to form a total current.

22. The infeed arrangement as claimed in claim 21, wherein the process computer of the inverter and one or more other process computers of the one or more other inverters are coupled to each other to exchange information for coordinating generation of the plurality of summation currents between the plurality of inverters.

23. A wind power installation having an aerodynamic rotor and a generator for generating electrical power from wind and for feeding the electrical power as electric current into an electrical supply network, wherein the wind power installation includes the inverter as claimed in claim 17.

24. The method as claimed in claim 6, wherein a ratio of the difference between the upper difference limit and lower difference limit of the difference band to the difference between the upper tolerance limit and lower tolerance limit of the tolerance band is greater than 1.5.

* * * * *